March 17, 1925.

V. F. MIKOLASEK 1,530,389

MOTOR METER

Filed Jan. 3, 1922

Inventor
Venceslaus F. Mikolasek,

By

Attorney

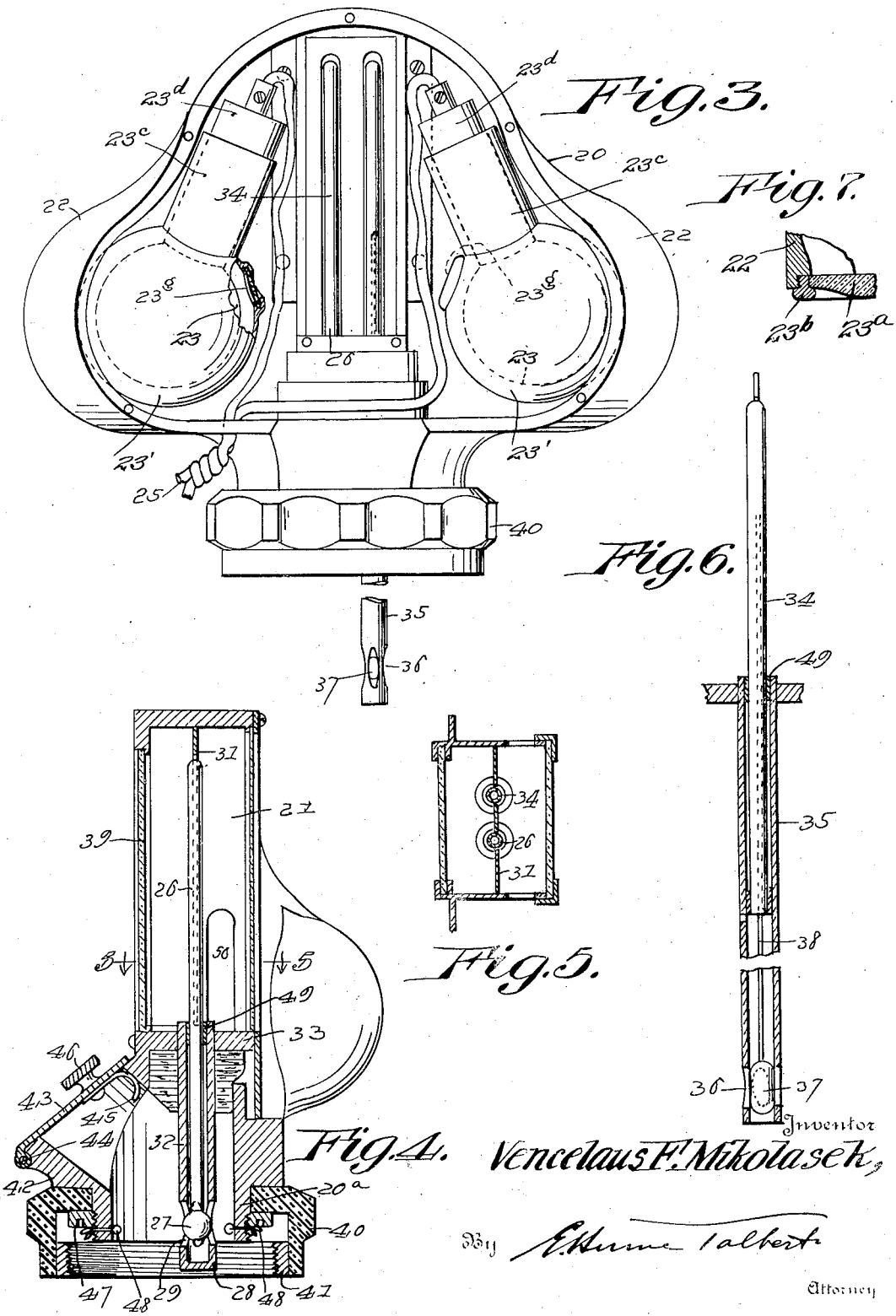

Patented Mar. 17, 1925.

1,530,389

UNITED STATES PATENT OFFICE.

VENCESLAUS F. MIKOLASEK, OF LANKIN, NORTH DAKOTA.

MOTOR METER.

Application filed January 3, 1922. Serial No. 526,710.

*To all whom it may concern:*

Be it known that VENCESLAUS F. MIKO-LASEK, a citizen of the United States of America, residing at Lankin, in the county of Walsh and State of North Dakota, has invented new and useful Improvements in Motor Meters, of which the following is a specification.

The object of the invention is to provide a combined moto-meter and direction indicator for use on the radiator cap or plug of a vehicle of the automobile type and furthermore to provide a moto-meter construction whereby both the temperature and the amount of the water in the radiator system may be indicated as a guide to the autoist not only as to when his engine is becoming overheated but as to when the radiator system needs refilling or replenishment; and with these general objects in view the invention consists in a construction and combination of parts of which a preferred embodiment is shown in the accompanying drawings, wherein:—

Figure 3 is a rear view of an apparatus embodying the invention.

Figure 4 is a vertical section on the plane indicated by the line 4—4 of Figure 1.

Figure 5 is a transverse section on the plane indicated by the line 5—5 of Figure 4.

Figure 6 is a view partly broken away of the depth indicator.

Figure 7 is a detail sectional view on the plane indicated by the line 7—7 of Figure 2.

Figure 1:
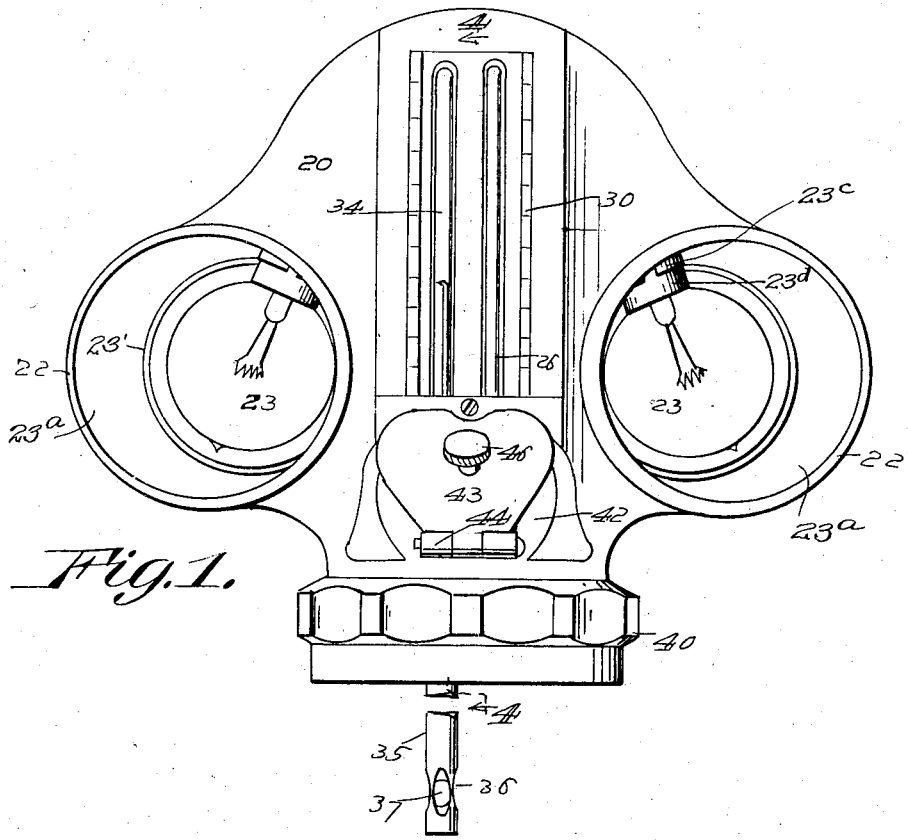
Figure 1 is a front view.
Figure 2:
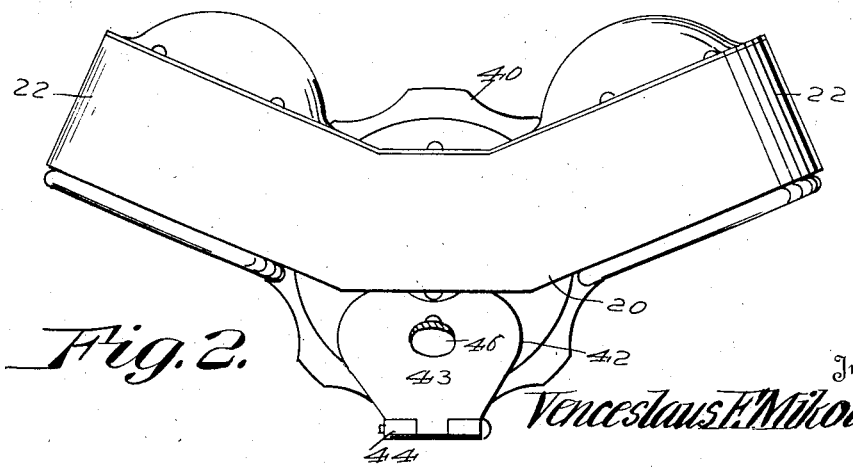
Figure 2 is a plan view.

The device consists essentially of a casing 20 having a central or intermediate compartment 21 and lateral wings constituting forwardly directed divergently related lamp casings 22 having bezels 23$^b$ for holding lenses 23$^a$ in position. Contained within the casings 22 are suitable reflectors 23' in which are arranged lighting units 23. The reflectors 23' have sleeves 23$^c$ in which extensions 23$^d$ of the lighting units are secured in any suitable manner. When any one of said lighting units is energized, a beam of light is projected to the right or left as a means of illuminating a portion or corresponding side of the road or the prospective path of the vehicle leading either to the right or the left and also as an indication to the driver of a following car the intention of the driver of the equipped car to turn or change the direction of travel. The reflectors have lenses 23$^e$ through which beams of light are projected upon the observation tubes 34. The conductors by which the lighting units are connected with a suitable source of energy are indicated at 25 and are controlled by suitable switches of the push button or other type located within convenient reach of the driver of the car but not illustrated herein by reason of the fact that any conventional or preferred arrangement thereof will be suitable for the purpose and may be varied to accord with the particular type of car in connection with which the apparatus may be used.

In the main or intermediate section of the apparatus between the direction lamp casings, in the embodiment of the invention which is illustrated in the drawings, there is arranged a thermometer 26 of which the bulb 27 is arranged in a cage 28 depending from the casing, and provided with circulating openings 29 so that the bulb is exposed directly to the temperature in the radiator, the graduations representing degrees of heat appearing on a scale 30 on a transverse plate 31 which is slotted to receive the stem of the thermometer.

The tube is fitted in a tubular guard 32 of which the cage 28 forms the lower end, and which is secured to and suspended from a base 33 and forming the bottom of the compartment 21 in which the thermometer tube is exposed. A similar observation tube, of glass or other transparent material is indicated at 34, being mounted as is the thermometer tube 26 in a guard tube 35 suspended from the base plate 33 with its lower end open and provided with lateral apertures 36 for the reception of a float 37 of which the stem 38 operates in the observation tube 34, and is visible to the observer through the transparent panels 39 forming the front and rear walls of the compartment 21, to indicate the depth of the water in the radiator, the lower end of said guard tube 35 being adapted to extend into and beyond the plane of the normal level of the water in the radiator.

In the construction illustrated the casting forming the body portion of the casing 20 is provided at its lower end with a reduced neck 20$^a$ which is fitted in an opening in a radiator cap 40 adapted to be fitted to the radiator filling opening as in the ordinary practice and in the construction illustrated having an inner threaded bushing 41 for engagement with the lip of the filling tube (not shown), but in order to avoid the necessity of removing the device from the radiator in order that the supply of water may be replenished, the casing of the apparatus is preferably provided with a filling nozzle 42 disposed at an inclination to the vertical axis of the device and fitted with a cover 43 hinged at 44 and provided with a suitable catch 45 and a knob or grip 46. The reduced neck portion 20ª of the casting is secured to the cap 40 by means of a collar 47 threaded upon the extremity of the neck and locked by cotter pins 48 or the equivalent thereof.

Moreover in order to protect the observation tubes of the thermometer and depth indicator from injurious jarring by the vibration of the car in use the upper ends of the guard tubes 32 and 35 are fitted with cushioning bushings 49 of rubber, cork or its equivalent, through which the said observation tubes extend.

Furthermore in order that the graduations or indications of the thermometer and depth indicator may be observed at night the walls of the compartment 21 in which the observation tubes are located are provided, in communication with the lamp casings, with openings 50 so that the light from either of the lighting units will shine upon and clearly disclose the tubes to an observer located either in front or in rear of the apparatus.

Having described the invention, what is claimed as new and useful is:—

A moto-meter attachment for motor driven vehicles, and adapted for application to the radiator plug or cap thereof having a casing provided with a central compartment and lateral wings consisting of compartments arranged in a forwardly divergent relation and containing independently actuable lighting units, and registering means arranged in said central compartment and disposed to face rearwardly and having controlling means depending into the radiator, said registering means being disposed in the paths of light radiating from the lighting units.

In testimony whereof he affixes his signature.

VENCESLAUS F. MIKOLASEK.